United States Patent Office 3,525,743
Patented Aug. 25, 1970

3,525,743
PHENOTHIAZINE DERIVATIVES
Milton Wolf, West Chester, and Francis J. Greek, Philadelphia, Pa., assignors to American Home Products Corporation, New York, N.Y., a corporation of Delaware
No Drawing. Continuation-in-part of application Ser. No. 495,698, Oct. 13, 1965. This application Feb. 29, 1968, Ser. No. 709,237
Int. Cl. C07d 93/14
U.S. Cl. 260—243
9 Claims

ABSTRACT OF THE DISCLOSURE

Pyrrolophenothiazine-1,2-diones are prepared having pharmacological activity, demonstrating particularly analgesic activity. They are useful in the field of experimental pharmacology.

---

This application is a continuation-in-part of our application Ser. No. 495,698, filed Oct. 13, 1965, now abandoned.

This invention relates to phenothiazine derivatives and more particularly pyrrolo-phenothiazines and the method for preparing them.

The compounds of the invention have the formula:

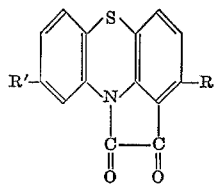

where R' is intended to represent hydrogen, halogen, such as chlorine, bromine, or fluorine, lower alkanoyl, trifluoromethyl or sulfamoyl, and R stands for hydrogen, lower alkoxy, lower alkyl or methyl mercapto; with the proviso that either R or R' must always be hydrogen.

By the expression "lower alkyl" or "lower alkoxy," a radical or substituent having from 1 to 3 carbon atoms is intended.

By the expression "lower alkanoyl" a radical having 2 to 4 carbon atoms is intended.

Preferably R' represents either chlorine, a lower alkanoyl of 2 to 3 carbon atoms or trifluoromethyl, while R would represent hydrogen.

The method for preparing these compounds may be illustrated by the following reaction scheme, with R and R' having the meanings indicated above:

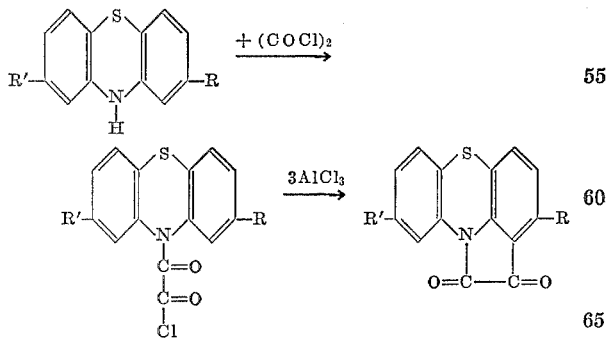

It should be pointed out that where R' represents an electron withdrawing group such as halogen, trifluoromethyl, lower alkanoyl or sulfamyl, the ring closure in the second step takes place on the unsubstituted benzene ring (R being hydrogen). On the other hand, if R' is hydrogen and R represents an electron donating group such as alkyl, alkoxy, methylmercapto, the ring will close to the substituted benzene ring. However, in either case, a small amount of the isomer is always formed.

A modification of the above reaction is the use of a dichloride having the formula $ClCO-(CH_2)_n-COCl$ where $n$ is an integer of 1 to 4. Such a reactant would result in the formation of 6- to 9-membered rings in place of the 5-membered pyrrolo ring shown above.

It should also be noted that while aluminum chloride is the preferred agent for ring closure, other Lewis acids could be used, for example, $SnCl_4$ or $BF_3$.

Specifically describing the process in accordance with the reaction scheme shown above, a substituted phenothiazine is reacted with oxalyl chloride at a temperature in the range of from 30–150° C., with or without a non-reactive solvent, to produce the corresponding 10-glyoxyloyl chloride which is separated from the reaction mixture. To the separated product in a solvent such as carbon disulfide is then added with stirring approximately 3 moles of anhydrous aluminum chloride, a little at a time. The mixture is refluxed until reaction is complete and the mixture is then cooled and chilled in ice and treated with concentrated hydrochloric acid, the desired final product separating out as a colored solid, generally violet in appearance.

The following examples illustrate in greater detail the preparation of typical compounds.

EXAMPLE 1

Preparation of 2-chlorophenothiazine-10-glyoxyloyl chloride

A mixture of 2-chlorophenothiazine (10.00 g., 0.042 m.) and oxalyl chloride (40.0 g., 0.31 m.) is refluxed on the steam bath for three hours, and the excess oxalyl chloride removed by distillation in vacuo. The residual greenish oil crystallizes on storage at room temperature. The residue is triturated with hexane, and the grey-green solid collect by filtration; the yield is 12.6 g. (92.6%), M.P. 117–118° C. dec. (uncorr.). A sample for analysis was recrystallized from ether-pentane, colorless prisms, M.P. 116–117° C. dec. (uncorr.).

Analysis. — Calcd. for $C_{14}H_7Cl_2NO_2S$ (percent): C, 51.87; H, 2.17; Cl, 21.88; N, 4.32. Found (percent): C, 52.07; H, 2.16; Cl, 21.7; N, 4.18.

In the same way, the following starting compounds may be reacted with oxalyl chloride:

2-trifluoromethylphenothiazine
2-sulfamoylphenothiazine
2-acetylphenothiazine
2-methylphenothiazine
2-butyrylphenothiazine
2-propionylphenothiazine
2-methoxyphenothiazine
2-ethoxyphenothiazine
2-methylmercaptophenothiazine
2-bromophenothiazine
2-ethylphenothiazine
2-fluorophenothiazine The compounds produced will be the corresponding phenothiazine-10-glyoxyloyl chlorides.

EXAMPLE 2

Preparation of 9-chloropyrrolo [3,2,1-k,1]-phenothiazine-1,2,-dione

Aluminum chloride (13.2 g., 0.099 m.) is added in small portions to a mechanically stirred solution of 2-chlorophenothiazine - 10 - glyoxyloyl chloride (10.00 g., 0.031 m.) in carbon disulfide (100 ml.) over a period of about ten minutes. A dark reddish brown, gummy solid separates during this period. The reaction mixture is refluxed with stirring for one hour, cooled, poured onto a mixture of ice (100 g.) and concentrated hydrochloric acid (50 ml.). The product separates as a deep blue-violet solid, almost black in appearance. The carbon disulfide is removed by blowing a stream of nitrogen through the mixture, and finally by heating on the steam bath. The crude product is collected by filtration, washed with water, then stirred in suspension in 5% aqueous sodium bicarbonate solution for 15 minutes. The product is collected by filtration, washed with water, dried at 50° C./house vac. The yield of crude product is 7.0 g. (79.1%) of deep blue-violet solid, M.P. 243–244° dec. (uncorr.). A sample for analysis is recrystallized from glacial acetic acid, deep violet needles, M.P. 240° C. dec. (uncorr.).

*Analysis.* — Calcd. for $C_{14}H_6ClNO_2S$ (percent): C, 58.44 H, 2.10; N, 4.86; Cl, 12.32. Found (percent): C, 58.22; H, 2.19; N, 4.81; Cl. 11.8.

EXAMPLE 3

Preparation of 9-propionylpyrrolo-[3,2,1-k,1]-phenothiazine-1,2-dione

The reaction of 2-propionylphenothiazine-10-glyoxylic acid chloride (20.0 g., 0.058 m.) with anhydrous aluminum chloride (32.5 g., 0.243 m.) in a manner similar to that of Example 2 affords the title compound (30.0 g., 92.4%), M.P. 183° C., (uncorr.). Recrystallization of the crude product from tetrahydrofuran gives violet needles (6.5 g., 35.0%), M.P. 224.5–226.5° C. (uncorr.).

*Analysis.*—Calcd. for $C_{17}H_{11}NO_3S$ (percent): C, 66.05; H, 3.59; N, 4.52. Found (percent): C, 66.20; H, 3.44; N, 4.69.

Other substituted phenothiazine derivatives may be prepared in the same manner as taught in the preceding illustrative examples, merely utilizing one of the above-mentioned phenothiazine-10-glyoxyloyl chlorides, with one exception, where the Lewis acid is concerned.

Where one plans to start with a 2-lower alkoxyphenothiazine, the amount of Lewis acid must be increased at least by an additional mole of acid, preferably doubling the molar amount of $AlCl_3$, $SnCl_4$, or $BF_3$ mentioned in Examples 2 or 3. Otherwise, the procedure as described in either of these examples is the same in preparing the following compounds:

9-trifluoromethylpyrrolo-[3,2,1-k,1]-phenothiazine-1,2-dione.
9-sulfamoylpyrrolo-[3,2,1-k,1]-phenothiazine-1,2-dione.
9-acetylpyrrolo-[3,2,1-k,1]-phenothiazine-1,2-dione.
3-methylpyrrolo-[3,2,1-k,1]-phenothiazine-1,2-dione.
3-methoxypyrrolo-[3,2,1-k,1]-phenothiazine-1,2-dione.
3-ethoxypyrrolo-[3,2,1-k,1]-phenothiazine-1,2-dione.
9-methylmercaptopyrrolo-[3,2,1-k,1]-phenothiazine-1,2-dione.
3-ethylpyrrolo-[3,2,1-k,1]-phenothiazine-1,2-dione.
9-fluoropyrrolo-[3,2,1-k,1]-phenothiazine-1,2-dione.

The final compounds described above have been found to be pharmacologically active and particularly useful in the field of experimental pharmacology. One use found for the compounds is as an analgesic agent which was determined by carring out a modified D'Amour and Smith analgesic evaluation test, J. Pharm. 72:74, 1941, the procedure in detail being as follows. Host: Male rats (150–200 gms.).

Groups of 10 rats are placed in individual holders. The holders are placed so that a high intensity light beam shines on the tip of the tail. The intensity of the light beam is adjusted so that normal rats respond by moving their tails out of the light beam in 3 to 8 seconds. The average of two readings taken 20 minutes apart serves as a pre-dug control. Rats are selected for testing whose control readings agree within one second. Compounds are administered orally or intraperitoneally and reaction times are measured every 20 minutes for 2 hours after drug administration. Post drug reaction times are compared to the control average and are tested for significance by the method of Bonnycastle and Bliss.

By the above procedure, the stated activity was found using an intraperitoneally injected dose of 25 mg./kg.

All of the compounds may be utilized either in the basic form or as acid-addition salts, the latter being prepared in well-known manner by reacting the base with a suitable organic or mineral acid. For pharmacological use, pharmaceutically acceptable non-toxic salts are prepared as aforesaid, using either mineral acids, for example, hydrochloric, hydrobromic, sulfuric or phosphoric acids, or an organic acid that results in a non-toxic acid-addition salt at the dosage used, which may be, for example, acetic, tartaric, fumaric, maleic or any other common acid for the use intended.

The compounds, which are relatively non-toxic up to 400 mg./kg., may be administered either orally or parenterally, and either alone or combined with similarly active ingredients. Extenders, carriers or other excipients may be used. For parenteral administration, an aqueous vehicle is generally used with an acid-addition salt of the active component.

The invention claimed is:

1. the process comprising reacting a phenothiazine having the formula:

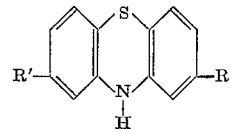

in which R' represents hydrogen, lower alkanoyl of 2 to 4 carbon atoms, halogen of the group chlorine, bromine, or fluorine, trifluoromethyl or sulfamoyl, while R stands for hydrogen, lower alkyl, lower alkoxy, wherein each of these has no more than 3 carbon atoms, or methylmercapto with the proviso that either R or R' is always hydrogen, at a temperature in the range of about 30 to 150° C., with a molar excess of oxalyl chloride to form a 10-phenothiazine glyoxyloyl chloride, removing excess oxalyl chloride by distillation and then reacting the 10-phenothiazine glyoxyloyl chloride formed at refluxing temperature with at least three moles of a Lewis acid of the group aluminum chloride, tin tetrachloride or boron trifluoride to form a tetracyclic product represented by the formula:

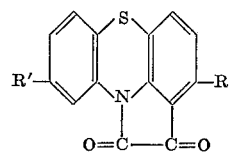

where R and R' have the aforesaid meanings with the proviso that either R or R' is always hydrogen.

2. The process of claim 1; in which the starting compound is one where R' is a lower alkanoyl of 2 to 3 carbon atoms, chlorine, trifluoromethyl or sulfamoyl and R is hydrogen.

3. The process of claim 1; in which the starting compound is one where R' is hydrogen and R stands for methylmercapto, lower alkyl or lower alkoxy, each of the latter having no more than 3 carbon atoms.

4. A compound having the formula:

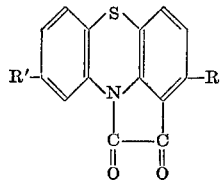

wherein R' represents hydrogen, lower alkanoyl of 2 to 4 carbon atoms, halogen of the group chlorine, bromine or fluorine, trifluoromethyl or sulfamoyl, while R stands for hydrogen, lower alkyl, lower alkoxy, each of which has no more than 3 carbon atoms, or methylmercapto; with the proviso that either R or R′ must always be hydrogen; and the pharmaceutically acceptable acid-addition salts thereof.

5. A compound of claim 4; wherein R′ represents chlorine, a trifluoromethyl or lower alkanoyl of 2 to 3 carbon atoms and R stands for hydrogen; and the pharmaceutically acceptable acid-addition salts.

6. A compound of claim 4; wherein R′ represents hydrogen and R stands for lower alkyl, lower alkoxy in which each has no more than 3 carbon atoms, or methylmercapto; and the nontoxic acid-addition salts thereof.

7. As a compound of claim 4; 9-chloropyrrolo [3,2,1-k,1]-phenothiazine-1,2-dione.

8. As a compound of claim 4; 9-propionylpyrrolo [3,2,1-k,1]-phenothiazine-1,2-dione.

9. As a compound of claim 4; 9-trifluoromethylpyrrolo [3,2,1-k,1]-phenothiazine-1,2-dione.

References Cited

Harfenist et al., J. Org. Chem., vol. 27, pp. 39, 77–82 (November 1962).

HENRY R. JILES, Primary Examiner

H. I. MOATZ, Assistant Examiner

U.S. Cl. X.R.

424—247